No. 878,986. PATENTED FEB. 11, 1908.
J. F. McCANN.
RAILWAY LAMP.
APPLICATION FILED DEC. 7, 1907.
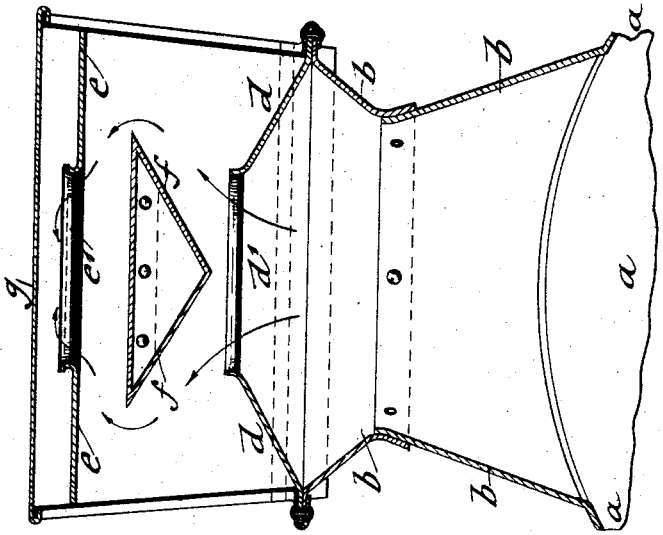
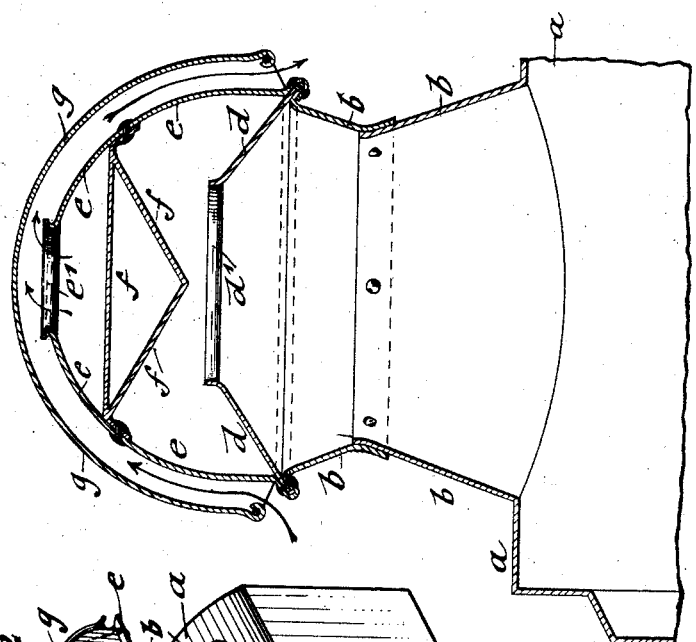
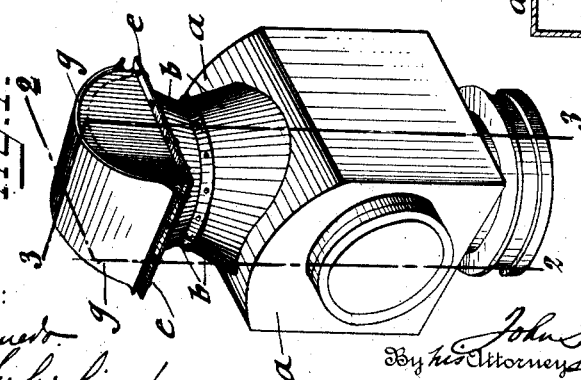

UNITED STATES PATENT OFFICE.

JOHN F. McCANN, OF NEW YORK, N. Y.

RAILWAY-LAMP.

No. 878,986.      Specification of Letters Patent.      Patented Feb. 11, 1908.

Application filed December 7, 1907. Serial No. 405,552.

*To all whom it may concern:*

Be it known that I, JOHN F. McCANN, a citizen of the United States, residing in New York, in the borough of the Bronx, county and State of New York, have invented certain new and useful Improvements in Railway-Lamps, of which the following is a specification.

This invention relates to an improved lamp for locomotives, cars etc. and more especially to a ventilating top for the same, by which a current of cold air is conducted through the top of the lamp and thereby a suction exerted on the hot products of combustion generated by the lamp so that said products are carried off in an effective manner and thereby the steady and uniform burning of the lamp is produced; and for this purpose the invention consists of a ventilating top for railway-lamps which comprises a chimney-portion at the top of the lamp-casing, a conical portion on the same provided with a central opening, a deflector of inverted conical shape located above the conical portion, a semi-cylindrical shell extending from the base of the conical portion to a point above the deflector, said shell being provided with an outlet-opening in its upper part, and a semi-cylindrical cover extending over the shell and forming with the latter transverse openings at the front and rear-ends for taking the current of cold air and carrying along the hot products of combustion through the space between the shell and cover through the opposite end to the outside, as will be fully described hereinafter and finally pointed out in the claims.

In the accompanying drawings, Figure 1 represents a perspective view of a railway-lamp with my improved ventilating top, Fig. 2 is a vertical longitudinal section on line 2, 2, Fig. 1, and Fig. 3 is a vertical transverse section on line 3, 3, Fig. 1.

Similar letters of reference indicate corresponding parts throughout the views.

Referring to the drawings, $a$ represents the casing of a railway-lamp of any approved construction. To the top-part of the same is applied my improved ventilating top by means of a chimney-like portion $b$ of oval or cylindrical shape, to which is riveted or otherwise attached a conical portion $d$ which is provided with a circular opening $d^1$ in its upper end. The conical portion $d$ is connected at its outwardly-bent circumference by means of rivets or other fastening devices with a semi-cylindrical shell $e$ which is closed at the sides, as shown in Fig. 3, and which is attached by its flanged lower and bent-over ends to the riveted flanges of the chimney $b$ and conical portion $d$. The semi-cylindrical shell $e$ is provided with an oval opening $e^1$ at its upper end, the edge of the shell along said opening being bent outwardly.

To the inside of the shell $e$ is riveted or otherwise attached a deflector $f$, of inverted conical shape which is closed at the upper end and around which the hot products of combustion are drawn from the opening $d^1$ of the cone $d$ to the opening $e^1$ of the semi-cylindrical shell $e$. Over the shell $e$ extends an exterior cover $g$ also of semi-cylindrical shape and concentric with the inner shell $e$, said shell inclosing a space which is open at the lower front and rear-ends and closed at the sides so as to take up a current of cold air at one or the other end, according to the direction in which the locomotive, car or other vehicle to which the lamp is applied is moving or according to the direction of the wind. The cold air passes through the space formed between the shells $e$ and $g$, over the opening $e^1$ of the inner shell and out at the opposite end of the space between the shells $e$ and $g$, and carries along the hot products of combustion delivered through the opening $e^1$ and conducts them off without exerting a back-draft on the flame of the lamp. The cold air current produces a suction-action on the products of combustion and conducts them to the outside of the ventilating-top. By this arrangement the draft to which the top-part of the lamp is subjected by the quick motion of the locomotive or other vehicle, not only does not interfere with the proper burning of the lamp so as to cause the uneven burning or flickering of the same, but, on the contrary, keeps the flame steady as the suction exerted by the current of air that passes through the space between the concentric shell and cover carries away the products of combustion and secures the proper and reliable burning of the lamp.

Having thus described my invention, I claim as new and desire to secure by Letters Patent:

1. In a railway-lamp, the combination, with a lamp-casing, of a ventilating top comprising a chimney-portion at the top of the lamp-casing, an interior conical portion provided with an opening, a semi-cylindrical shell extending over said conical portion and provided with an outlet-opening, a conical deflector within said shell, and a cover extending over said semi-cylindrical shell, said shell and cover being provided with transverse openings at the front- and rear-ends for taking up a current of air at one end and carrying off the products of combustion at the opposite end.

2. The combination, with the casing of a railway-lamp, of a chimney-portion attached to the top of the same, a conical portion attached to said chimney-portion and provided with an opening at its upper end, an interior semi-cylindrical shell attached to the base of the conical portion, and provided with an outlet opening, a deflector of inverted conical shape attached to the inside of the shell, and a semi-cylindrical cover extending over the shell, said shell and cover being provided at their lower ends with transverse front and rear-openings so as to take up a current of cold air at one end and conduct it through the space between the shell and cover to the opposite end and carry off the products of combustion of the lamp.

In testimony, that I claim the foregoing as my invention, I have signed my name in presence of two subscribing witnesses.

JOHN F. McCANN.

Witnesses:
PAUL GOEPEL,
HENRY J. SUHRBIER.